United States Patent
Martinez Covarrubias et al.

(10) Patent No.: US 11,820,397 B2
(45) Date of Patent: Nov. 21, 2023

(54) LOCALIZATION WITH DIVERSE DATASET FOR AUTONOMOUS VEHICLES

(71) Applicant: UATC, LLC, Mountain View, CA (US)

(72) Inventors: Julieta Martinez Covarrubias, Toronto (CA); Raquel Urtasun, Toronto (CA); Shenlong Wang, Toronto (CA); Ioan Andrei Barsan, Toronto (CA); Gellert Sandor Mattyus, Toronto (CA); Alexandre Doubov, Oakville (CA); Hongbo Fan, Toronto (CA)

(73) Assignee: UATC, LLC, Mountain View, CA (US)

( * ) Notice: Subject to any disclaimer, the term of this patent is extended or adjusted under 35 U.S.C. 154(b) by 302 days.

(21) Appl. No.: 17/018,499

(22) Filed: Sep. 11, 2020

(65) Prior Publication Data

US 2021/0146949 A1 May 20, 2021

Related U.S. Application Data

(60) Provisional application No. 63/027,542, filed on May 20, 2020, provisional application No. 62/936,434, filed on Nov. 16, 2019.

(51) Int. Cl.
*B60W 60/00* (2020.01)
*G06T 15/08* (2011.01)
*G06N 20/00* (2019.01)

(52) U.S. Cl.
CPC ............ *B60W 60/001* (2020.02); *G06N 20/00* (2019.01); *G06T 15/08* (2013.01); *B60W 2420/52* (2013.01); *B60W 2554/4049* (2020.02)

(58) Field of Classification Search
CPC ....... B60W 60/001; B60W 2554/4049; B60W 2420/52; G06N 20/00; G06T 15/08
See application file for complete search history.

(56) References Cited

U.S. PATENT DOCUMENTS 10,134,182 B1 * 11/2018 Ma .......................... G06T 19/20
10,832,093 B1 * 11/2020 Taralova ............... G06F 18/217
(Continued)

OTHER PUBLICATIONS

Agarwal et al., "Building Rome in a Day", IEEE 12$^{th}$ International Conference on Computer Vision, Sep. 29-Oct. 2, 2009, Kyoto, Japan, pp. 72-79.

(Continued)

*Primary Examiner* — Peter D Nolan
*Assistant Examiner* — Mikko Okechukwu Obioha
(74) *Attorney, Agent, or Firm* — Dority & Manning, P.A.

(57) ABSTRACT

A computer-implemented method for localizing a vehicle can include accessing, by a computing system comprising one or more computing devices, a machine-learned retrieval model that has been trained using a ground truth dataset comprising a plurality of pre-localized sensor observations. Each of the plurality of pre-localized sensor observations has a predetermined pose value associated with a previously obtained sensor reading representation. The method also includes obtaining, by the computing system, a current sensor reading representation obtained by one or more sensors located at the vehicle. The method also includes inputting, by the computing system, the current sensor reading representation into the machine-learned retrieval model. The method also includes receiving, by the computing system and from the machine-learned retrieval model, a determined current pose value for the vehicle based at least in part on one or more of the pre-localized sensor observations determined to be a closest match to the current sensor reading representation. The determined current pose value has an accuracy of within about one meter.

20 Claims, 7 Drawing Sheets

(56) References Cited

U.S. PATENT DOCUMENTS

| | | | |
|---|---|---|---|
| 2015/0379715 A1* | 12/2015 | Chandrasekar | G06F 16/51 701/28 |
| 2018/0364366 A1* | 12/2018 | Cvijetic | H04W 64/00 |
| 2019/0219699 A1* | 7/2019 | Ahn | G01S 5/163 |
| 2021/0104065 A1* | 4/2021 | Hasberg | G06N 3/045 |
| 2021/0125366 A1* | 4/2021 | Hasberg | G06T 7/70 |
| 2021/0365712 A1* | 11/2021 | Lu | G06V 10/764 |

OTHER PUBLICATIONS

Arandelovic et al.. "NetVLAD: CNN architecture for weaklv supenised place recognition", Conference on Computer Vision and Pattern Recognition, Jun. 26-Jul. 1, 2016, Las Vegas, NV, pp. 5297-5307.

Babenko et al., "The Inverted Multi-Index", IEEE Conference on Computer Vision and Pattern Recognition, Jun. 16-21, 2012, Providence, RI, pp. 3069-3076.

Bansal et al., "Understanding How Camera Configuration and Environmental Conditions Affect Appearance-based Localization", IEEE Intelligent Vehicles Symposium (IV). Jun. 8-11, 2014, Dearborn, Michigan, pp. 800-807.

Barsan et al., "Learning to Localize Using a LiDAR Intensity Map", Conference on Robot Learning, Oct. 29-31, 2018, Zurich, Switzerland, 12 pages.

Bay et al., "SURF: Speeded Up Robust Features", European Conference on Computer Vision, May 7-13, 2006, Graz, Austria, pp. 404-417.

Brachmann et al., "Learning Less is More—6D Camera Localization via 3D Surface Regression", IEEE Conference on Computer Vision and Pattern Recognition, Jun. 18-22, 2018, Salt Lake City, UT, pp. 4654-4662.

Brachmann et al., "Uncertainty-Driven 6D Pose Estimation of Objects and Scenes from a Single RGB Image", IEEE Conference on Computer Vision and Pattern Recognition, Jun. 26-Jul. 1, 2016, Las Vegas, NV, pp. 3364-3372.

Brahmbhatt et al., "Geometry-Aware Learning of Maps for Camera Localization", IEEE Conference on Computer Vision and Pattern Recognition, Jun. 18-22, 2018, Salt Lake City, UT, pp. 2616-2625.

Camposeco et al., "Hybrid Scene Compression for Visual Localization", IEEE Conference on Computer Vision and Pattern Recognition, Jun. 16-20, 2019, Long Beach, CA, pp. 7645-7654.

Carlevaris-Bianco et al., "University of Michigan North Campus Long-Term Vision and Lidar Dataset", International Journal of Robotics Research, Aug. 2016, vol. 35, No. 9, 19 pages.

Chen et al., "City-Scale Landmark Identification on Mobile Devices", IEEE Conference on Computer Vision and Pattern Recognition, Jun. 20-25, 2011, Colorado Springs, CO, pp. 737-744.

Chen et al., "Multi-View 3D Object Detection Network for Autonomous Driving", IEEE Conference on Computer Vision and Pattern Recognition, Jul. 21-26, 2017, Honolulu, Hawaii, pp. 6526-6534.

Cieslewski et al., "Data-Efficient Decentralized Visual Slam", IEEE International Conference on Robotics and Automation (ICRA), May 21-25, 2018, Brisbane, Australia, pp. 2466-2473.

Datar et al., "Locality-Sensitivity Hashing Scheme Based on p-Stable Distributions", Symposium on Computational Geometry, Jun. 8-11, 2004, Brooklyn, NY, pp. 253-262.

Dewan et al., "Learning a Local Feature Descriptor for 3D LiDAR Scans". IEEE/RSJ International Conference on Intelligent Robots and Systems (IROS), Oct. 1-5, 2018, Madrid, Spain, pp. 4774-4780.

Dusmanu et al., "D2-Net: A Trainable CNN for Joint Description and Detection of Local Features", IEEE Conference on Computer Vision and Pattern Recognition, Jun. 16-20, 2019, Long Beach, CA, pp. 8092-8101.

Filliat et al., "A visual bag of words method for interactive qualitative localization and mapping", IEEE International Conference on Robotics and Automation, Apr. 10-14, 2007, Roma, Italy, pp. 3921-3926.

Geiger et al.. "Are we ready for Autonomous Driving? The KITTI Vision Benchmark Suite", IEEE Conference on Computer Vision and Pattern Recognition, Jun. 16-21, 2012, Providence, RI, pp. 3354-3361.

Gong et al., "Iterative Quantization: A Procrustean Approach to Learning Binary Codes", IEEE Conference on Computer Vision and Pattern Recognition, Jun. 20-25, 2011, Colorado Springs, CO, pp. 817-824.

Gordo et al., "Deep Image Retrieval: Learning Global Representations for Image Search", European Conference on Computer Vision, Amsterdam, The Netherlands. Oct. 11-14, 2016, pp. 241-257.

Havlena et al., "VocMatch: Efficient Multiview Correspondence for Structure from Motion", European Conference on Computer Vision, Sep. 6-12, 2014, Zurich, Switzerland, pp. 46-60.

He et al., "M2DP: A Novel 3D Point Cloud Descriptor and Its Application in Loop Closure Detection", IEEE/RSJ International Conference on Intelligent Robots and Systems (IROS), Oct. 9-14, 2016, Daejeon, Korea, pp. 231-237.

Henriques et al., "MapNet: An Allocentric Spatial Memory for Mapping Environments", IEEE Conference on Computer Vision and Pattern Recognition, Jun. 18-22, 2018, Salt Lake City, UT, pp. 8476-8484.

Irschara et al., "From Structure-from-Motion Point Clouds to Fast Location Recognition", IEEE Computer Society Conference on Computer Vision and Pattern Recognition, Jun. 20-25, 2009, Miami, Florida, pp. 2599-2606.

Jegou et al., "Aggregating local descriptors into a compact image representation". Computer Vision and Pattern Recognition, Jun. 13-18, 2010, San Francisco, CA, pp. 3304-3311.

Jegou et al., "Hamming Embedding and Weak Geometric Consistencv for Large Scale Image Search", European Conference on Computer Vision, Oct. 12-18, 2008, Marseille, France, pp. 305-317.

Jegou et al., "On the burstiness of visual elements", IEEE Computer Society Conference on Computer Vision and Pattern Recognition, Jun. 20-25, 2009, Miami, Florida, pp. 1169-1176.

Jegou et al., "Product Quantization for Nearest Neighbor Search", IEEE Transactions on Pattern Analysis and Machine Intelligence, Jan. 2011, vol. 33. No. 1, pp. 117-128.

Kalantidis et al., "Cross-Dimensional Weighting for Aggregated Deep Convolutional Features", European Conference on Computer Vision, Oct. 8-16, 2016, Amsterdam, The Netherlands, pp. 685-701.

Kendall et al., "Modelling Uncertainty in Deep Learning for Camera Relocalization", IEEE International Conference on Robotics and Automation (ICRA), May 16-21, 2016, Stockholm, Sweden, pp. 4762-4769.

Kendall et al., "PoseNet: A Convolutional Network for Real-Time 6-DOF Camera Relocalization", International Conference on Computer Vision, Dec. 11-18, 2015, Las Condes, Chile, pp. 2938-2946.

Klokov et al., "Escape from Cells: Deep Kd-Networks for the Recognition of 3D Point Cloud Models", International Conference on Computer Vision, Oct. 22-29, 2017, Venice, Italy, pp. 863-872.

Knopp et al., "Avoiding Confusing Features in Place Recognition", European Conference on Computer Vision, Sep. 5-11, 2010, Crete, Greece, pp. 749-761.

Levinson et al., "Map-Based Precision Vehicle Localization in Urban Environments", Robotics: Science and Systems Conference, Jun. 27-30, 2007, Atlanta, GA, 8 pages.

Levinson et al., "Robust Vehicle Localization in Urban Environments Using Probabilistic Maps", IEEE International Conference on Robotics and Automation, May 3-8, 2010, Anchorage, Alaska, pp. 4372-4378.

Li et al., "Location Recognition Using Prioritized Feature Matching", European Conference on Computer Vision, Sep. 5-11, 2010, Crete, Greece, pp. 791-804.

Li et al., "Worldwide Pose Estimation Using 3D Point Clouds", European Conference on Computer Vision, Oct. 7-13, 2012, Florence, Italy, pp. 15-29.

Liu et al., "Efficient Global 2D-3D Matching for Camera Localization in a Large-Scale 3D Map", International Conference on Computer Vision, Oct. 22-29, 2017, Venice, Italy, pp. 2391-2400.

Liu et al., "Loop-Closure Detection Based on 3D Point Cloud Learning for Self-Driving Industry Vehicles" arXiv:1904.13030v1, Apr. 30, 2019, 8 pages.

(56) References Cited

OTHER PUBLICATIONS

Liu et al.. "LPD-Net: 3D Point Cloud Learning for Large-Scale Place Recognition and Environment Analysis", International Conference on Computer Vision, Oct. 27-Nov. 2, 2019, Seoul, Korea, pp. 2831-2840.
Lowe, "Object Recognition from Local Scale-Invariant Features", International Conference on Computer Vision, Sep. 20-25, 1999, Corfu, Greece, 8 pages.
Luo et al., "Fast and Furious: Real Time End-to-End 3D Detection, Tracking and Motion Forecasting with a Single Convolutional Net", Conference on Computer Vision and Pattern Recognition, Jun. 18-22, 2018 Salt Lake City, UT, pp. 3569-3577.
Lynen et al., "Large-scale, real-time visual-inertial localization revisited", arXiv:1907.00338v1, Jun. 30, 2019, 21 pages.
Maddern et al., "1 year, 1000 km: The Oxford RobotCar dataset", The International Journal of Robotics Research, 2016, vol. 36, No. 1, pp. 3-15.
Martinez et al., "Revisiting Additive Quantization", European Conference on Computer Vision, Oct. 11-14, 2016, Amsterdam, The Netherlands, pp. 137-153.
Matsui et al., "PQTable: Fast Exact Asymmetric Distance Neighbor Search for Product Quantization using Hash Tables", International Conference on Computer Vision. Dec. 11-18, 2015, Las Condes, Chile, pp. 1940-1948.
Muja et al., "Scalable Nearest Neighbor Algorithms for High Dimensional Data", IEEE Transactions on Pattern Analysis and Machine Intelligence, Nov. 2014, vol. 36, No. 11, pp. 2227-2240.
Norouzi et al., "Cartesian k-means", Conference on Computer Vision and Pattern Recognition, Jun. 23-28, 2013, Portland, OR, pp. 3017-3024.
Norouzi et al., "Hamming Distance Metric Learning", Conference on Neural Information Processing Systems (NIPS), Dec. 3-8, 2012, Lake Tahoe, Nevada, 9 pages.
Pomerleau et al., "A Review of Point Cloud Registration Algorithms for Mobile Robotics", Foundations on Trends in Robotics, Now Publishers, 2015, vol. 4, No. 1, pp. 1-108.
Qi et al., "PointNet: Deep Learning on Point Sets for 3D Classification and Segmentation", arXiv:1612.00593v1, Dec. 2, 2016, 19 pages.
Qi et al., "PointNet++: Deep Hierarchical Feature Learning on Point Sets in a Metric Space", Conference on Neural Information Processing Systems, Dec. 4-9, 2017, Long Beach, CA, 10 pages.
Radenovic et al., "CNN Image Retrieval Learns from BoW: Unsupervised Fine-Tuning with Hard Examples", Conference on Neural Information Processing Systems, Dec. 4-9, 2017, Long Beach, CA, pp. 3-20.
Radwan et al., "VLocNet++: Deep Multitask Learning for Semantic Visual Localization and Odometry", arXiv:1804.08366v6, Oct. 11, 2018, 16 pages.
Rusu et al., "Fast Point Feature Histograms (FPFH) for 3D Registration" IEEE International Conference on Robotics and Automation, May 12-17, 2009, Kobe, Japan, pp. 3212-3217.
Sarlin et al., "From Course to Fine: Robust Hierarchical Localization at Large Scale". IEEE/CVF Conference on Computer Vision and Pattern Recognition, Jun. 16-20, 2019, Long Beach, CA. pp. 12708-12717.
Sattler et al., "Are Large-Scale 3D Models Really Necessary for Accurate Visual Localization?", Conference on Computer Vision and Pattern Recognition, Jul. 21-26, 2017, Honolulu, Hawaii, pp. 6175-6184.
Sattler et al., "Benchmarking 6DOF Outdoor Visual Localization in Changing Conditions", Conference on Computer Vision and Pattern Recognition, Jun. 18-22, 2018, Salt Lake City, UT, pp. 8601-8610.
Sattler et al., "Fast Image-Based Localization using Direct 2D-to-3D Matching". IEEE International Conference on Computer Vision, Nov. 6-13, 2011, Barcelona, Spain, pp. 667-674.
Sattler et al., "Hyperpoints and Fine Vocabularies for Large-Scale Location Recognition", IEEE International Conference on Computer Vision, Dec. 11-18, 2015, Las Condes, Chile, pp. 2102-2106.
Sattler et al., "Image Retrieval for Image-Based Localization Revisited", British Machine Vision Conference, Sep. 3-7, 2012, Surrey, UK, 12 pages.
Sattler et al., "Large-Scale Location Recognition and the Geometric Burstiness Problem", IEEE Conference on Computer Vision and Pattern Recognition, Jun. 26-Jul. 1, 2016, Las Vegas, NV, pp. 1582-1590.
Sattler et al., "Understanding the Limitations of CNN-based Absolute Camera Pose Regression". IEEE/CVF Conference on Computer Vision and Pattern Recognition, Jun. 16-20, 2019, Long Beach, CA, pp. 3297-3307.
Schonberger et al., "Semantic Visual Localization", Conference on Computer Vision and Pattern Recognition, Jun. 18-22, 2018, Salt Lake City, UT, pp. 6896-6906.
Shotton et al., "Scene Coordinate Regression Forests for Camera Relocalization in RGB-D Image", IEEE Conference on Computer Vision and Pattern Recognition, Jun. 23-28, 2013, Portland, OR, pp. 2930-2937.
Tolias et al., "Particular Object Retrieval with Integral Max-Pooling of CNN Activations". arXiv:1511.05879v2, Feb. 24, 2016, 13 pages.
Tombari et al., "Unique Signatures of Histograms for Local Surface Description", European Conference on Computer Vision, Sep. 5-11, 2010, Crete, Greece, pp. 356-369.
Torii et al., "24/7 place recognition by view synthesis", IEEE Conference on Computer Vision and Pattern Recognition, Jun. 7-12, 2015, Boston, MA, pp. 1808-1817.
Torii et al., "Visual Place Recognition with Repetitive Structures", IEEE Transactions on Pattern Analysis and Machine Intelligence, Nov. 2015, vol. 37, No. 11, pp. 2346-2359.
Uy et al., "PointNetVLAD: Deep Point Cloud Based Retrieval for Large-Scale Place Recognition", Conference on Computer Vision and Pattern Recognition, Jun. 18-22, 2018, Salt Lake City, UT, pp. 4470-4479.
Valada et al., "Deep Auxiliary Learning for Visual Localization and Odometry", arXiv:1803.03642v1, Mar. 9, 2018, 9 pages.
Walch et al., "Image-based localization using LSTMs for structured feature correlation", International Conference on Computer Vision, Oct. 22-29, 2017, Venice, Italy, pp. 627-637.
Wan et al., "Robust and Precise Vehicle Localization based on Multi-sensor Fusion in Diverse City Scenes", arXiv:1711.05805v1, Nov. 15, 2017, 8 pages.
Wang et al., "DeLS-3D: Deep Localization and Segmentation with a 3D Semantic Map", Conference on Computer Vision and Pattern Recognition, Jun. 18-22, 2018, Salt Lake City, UT, pp. 5860-5869.
Wei et al., "Learning to Localize Through Compressed Binary Maps", IEEE/CVF Conference on Computer Vision and Pattern Recognition, Jun. 16-20, 2019, Long Beach, CA, pp. 10308-10316.
Wolcott et al., "Visual Localization within LIDAR Maps for Automated Urban Driving", IEEE/RSJ International Conference on Intelligent Robots and Systems, Sep. 14-18, 2014, Chicago, IL, pp. 176-183.
Yoneda et al., "Lidar Scan Feature for Localization with Highly Precise 3-D Map", IEEE Intelligent Vehicles Symposium (IV), Jun. 8-11, 2014, Dearborn, Michigan, pp. 1345-1350.
Zhang et al., "PCAN: 3D Attention Map Learning Using Contextual Information for Point Cloud Based Retrieval", IEEE/CVF Conference on Computer Vision and Pattern Recognition, Jun. 16-20, 2019, Long Beach, CA, pp. 12428-12437.

* cited by examiner

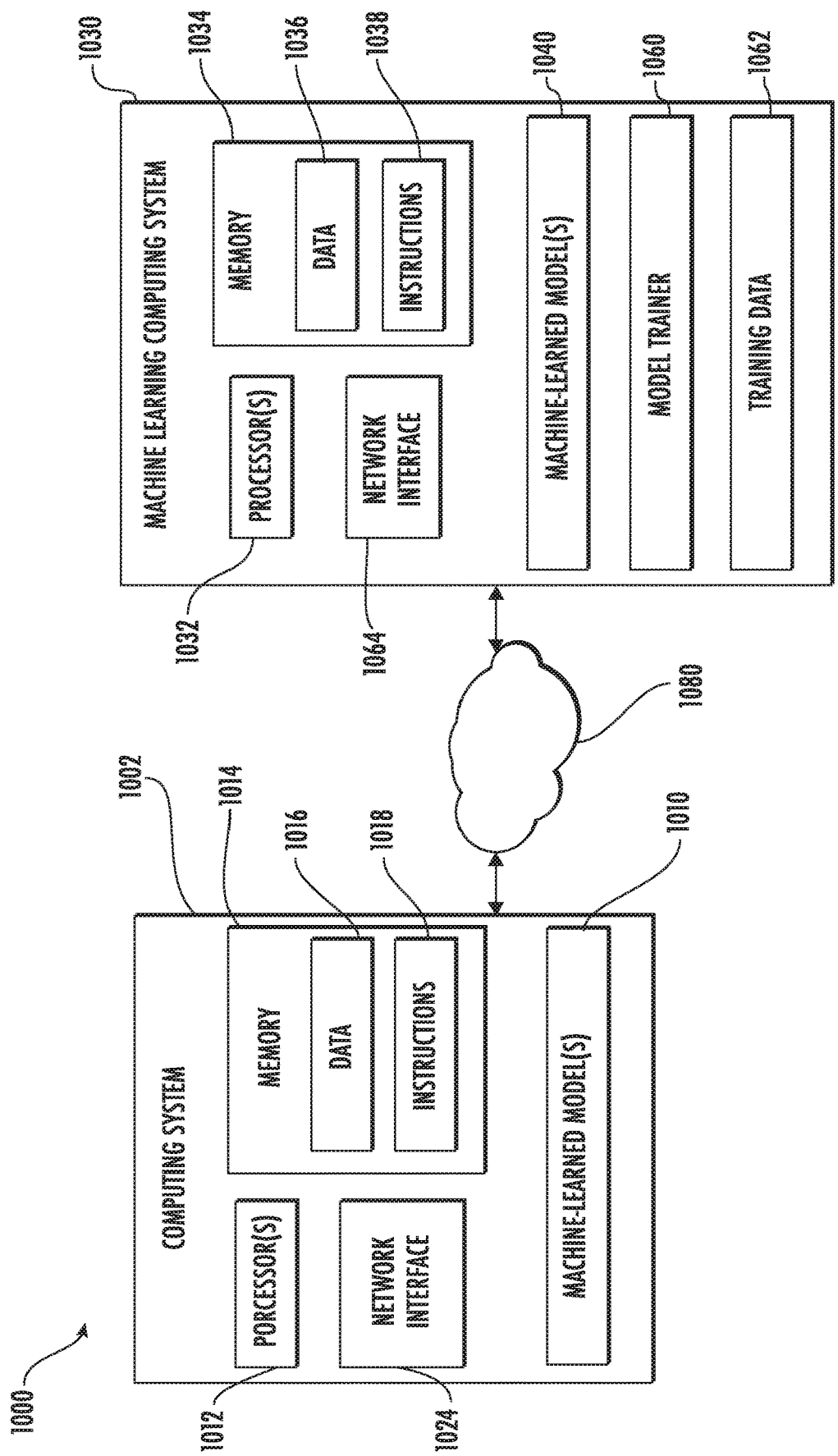

LOCALIZATION WITH DIVERSE DATASET FOR AUTONOMOUS VEHICLES

CROSS REFERENCE TO RELATED APPLICATIONS

The present application claims filing benefit of U.S. Provisional Patent Application Ser. No. 62/936,434 having a filing date of Nov. 16, 2019 and U.S. Provisional Patent Application Ser. No. 63/027,542 having a filing date of May 20, 2020, which are incorporated herein by reference in their entirety.

FIELD

The present disclosure relates generally to localization systems for autonomous vehicles. More particularly, the present disclosure relates to localization systems configured to localize an autonomous vehicle by global localization.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

Localization of an autonomous vehicle can refer to estimating a pose of the autonomous vehicle within the world. For instance, localization can be performed with regard to information from sensors available to the autonomous vehicle.

SUMMARY

Aspects and advantages of embodiments of the present disclosure will be set forth in part in the following description, or may be learned from the description, or may be learned through practice of the embodiments.

Aspects of the present disclosure are directed to a computer-implemented method for localizing a vehicle. The method includes accessing, by a computing system comprising one or more computing devices, a machine-learned retrieval model that has been trained using a ground truth dataset comprising a plurality of pre-localized sensor observations. Each of the plurality of pre-localized sensor observations has a predetermined pose value associated with a previously obtained sensor reading representation. The method also includes obtaining, by the computing system, a current sensor reading representation obtained by one or more sensors located at the vehicle. The method also includes inputting, by the computing system, the current sensor reading representation into the machine-learned retrieval model. The method also includes receiving, by the computing system and from the machine-learned retrieval model, a determined current pose value for the vehicle based at least in part on one or more of the pre-localized sensor observations determined to be a closest match to the current sensor reading representation. The determined current pose value has an accuracy of within about one meter.

Another aspect of the present disclosure is directed to a computer-implemented method for generating a ground truth dataset. The method includes obtaining, by a computing system comprising one or more computing devices, a dense scan of a region. The dense scan includes one or more sensor observations descriptive of a plurality of ground truth features. The method also includes obtaining, by the computing system, a plurality of dataset sensor observations of the region. The plurality of dataset sensor observations of the region are descriptive of the plurality of ground truth features. The method also includes localizing, based at least in part on vehicle dynamics and LIDAR registration, the plurality of dataset sensor observations against the dense scan to determine a pose of each of the plurality of dataset sensor observations. The method also includes providing, by the computing system, the plurality of dataset sensor observations and the pose of each of the plurality of dataset sensor observations for retrieval in a ground truth dataset. The ground truth dataset is configured for access by an autonomous vehicle to subsequently determine real-time localization.

Another aspect of the present disclosure is directed to a computer-implemented method for generating a ground truth dataset. The method includes obtaining, by a computing system comprising one or more computing devices, a dense scan of a region. The dense scan includes one or more sensor observations descriptive of a plurality of ground truth features. The method also includes obtaining, by the computing system, a plurality of dataset sensor observations of the region. The plurality of dataset sensor observations of the region is descriptive of the plurality of ground truth features. The method also includes localizing, based at least in part on vehicle dynamics and LIDAR registration, the plurality of dataset sensor observations against the dense scan to determine a pose of each of the plurality of dataset sensor observations. The method also includes providing, by the computing system, the plurality of dataset sensor observations and the pose of each of the plurality of dataset sensor observations for retrieval in a ground truth dataset. The ground truth dataset is configured for access by an autonomous vehicle to subsequently determine real-time localization.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

The attached Appendices describe example implementations of the proposed techniques in greater detail. The attached Appendices are incorporated into and form a part of this disclosure. However, the present disclosure is not limited to the example implementations provided in the attached Appendices.

BRIEF DESCRIPTION OF THE DRAWINGS

Detailed discussion of implementations directed to one of ordinary skill in the art is set forth in the specification, which refers to the appended figures, in which:

FIG. 7 depicts an example computing system according to example implementations of the present disclosure.

DETAILED DESCRIPTION

Figure 1:
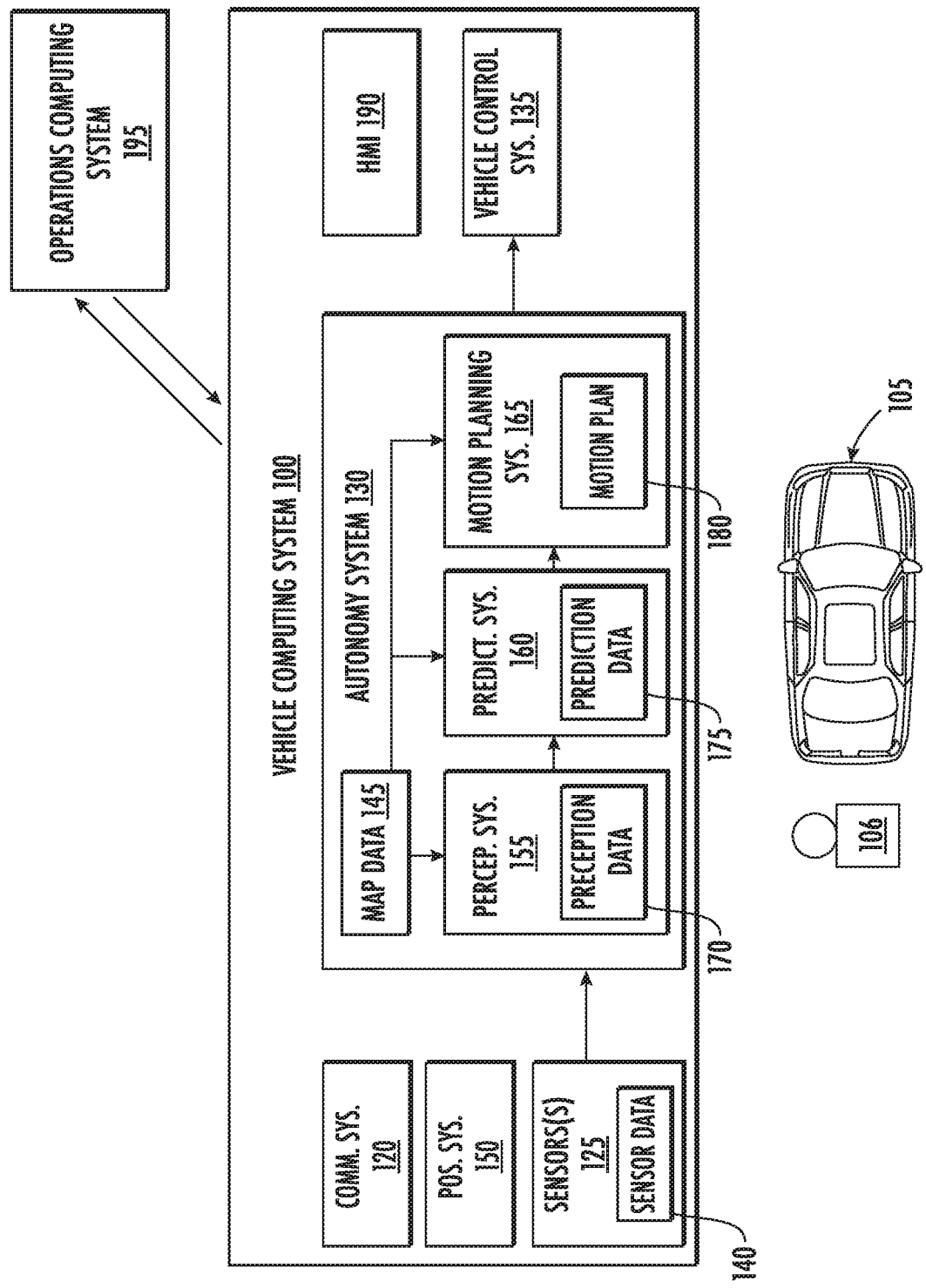
FIG. 1 depicts an example vehicle computing system according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to retrieval-based localization techniques for vehicles (e.g., autonomous vehicles). Retrieval-based localization involves determining a current pose of a vehicle by determining a nearest entry in a dataset of previously measured pose values. For instance, if an object (e.g., an autonomous vehicle) carrying a sensor captures sensor data (e.g., an image, LIDAR data, etc.), a computing system can determine the pose of the object by comparing the sensor data to a ground truth dataset of entries with known poses. For example, as used herein, the "pose" of an object can refer to the position and/or orientation of the object in the real world. The pose of the object can thus be estimated by the known poses of matching entries, such as a closest match entry.

Retrieval-based localization can be beneficial in some autonomous vehicle applications. For instance, retrieval-based localization techniques can be effectively scalable to a large coverage area. However, retrieval-based localization techniques can be sensitive to error in the poses of the entries in the ground truth dataset. For instance, in some cases, localization can require that pose values in the ground truth dataset be accurate to within less than a meter, in some cases. Furthermore, in some cases, it can be desirable that the reference poses achieve centimeter-level accuracy. This level of accuracy can especially be important for multisensory datasets that include different types of data. For instance, it can be beneficial to accurately depict correlation between the different types of data so the data does not result in contradictory estimated poses.

Additionally, diversity of the ground truth dataset can be advantageous. For instance, it can be beneficial for the ground truth dataset to capture data under many differing conditions, such as, for example, LIDAR occlusion, image occlusion, temperature, cloud cover, precipitation intensity, sun angle over horizon, visibility, UV conditions, precipitation type, trip type, and/or trip instance. Including data in the ground truth dataset captured under differing conditions can positively influence robustness of the dataset, for example. In addition to capturing the data under differing conditions, it can be beneficial to label the ground truth dataset with appropriate data defining the conditions under which each entry was captured. In some cases, this can require millions of annotated entries.

Furthermore, the ground truth dataset can desirably provide accurate and diverse ground truth data over a large coverage area. As one example, if the ground truth dataset is stored on an autonomous vehicle, it can be desirable for the ground truth dataset to cover an entire operational domain of the autonomous vehicle. As one example, if an autonomous vehicle operates within a city, it may be desirable for the ground truth dataset to accurately cover the entire city. In some cases, this can require ground truth datasets with entries spanning tens of square kilometers or greater. This can be beneficial, for instance, as it may prevent the autonomous vehicle from having to download additional data (e.g., entries for locations not covered by the dataset) to perform localization. As another example, the ground truth dataset can be employed as a benchmark for researching localization algorithms, which can require accurate data over a sufficiently comprehensive set of examples and cases so that the localization algorithms can be accurately tested.

Generating a ground truth dataset with sufficient accuracy and scope to cover localization operations can have high associated costs. For instance, in some cases, it can be difficult to provide adequate labels for a ground truth dataset that covers an entire operational domain of an autonomous vehicle (e.g., an entire city). For instance, one solution to annotating the ground truth dataset can include manual annotation. However, manual annotation can be time-consuming, and scale poorly for larger datasets (e.g., datasets spanning an entire city). Furthermore, in some cases, manually annotated data can be ambiguous. For example, if an entry is manually annotated with classifier data such as, for example, precipitation type, the entry may not provide suitable granularity for some localization tasks.

As another example, a solution to the problem can be to estimate the pose of the entries based on a geolocation system (e.g., GPS). While this can be quicker and/or cheaper than manual annotation, geolocation systems typically fail to provide suitable accuracy for localization tasks, such as localization tasks associated with an autonomous vehicle. For example, geolocation systems can introduce large error that may potentially have a magnitude of several meters. A large error on ground truth poses can introduce many challenges at localization, such as complicating the use of multisensory data. Another possible solution is to use structure-from-motion (SfM) models to derive ground truth poses. However, error of this approach can be difficult to quantify. Additionally, biases can be introduced into the poses based on the utilized feature matching algorithms. Because of these and other problems, many existing datasets fail to achieve adequate scale, diversity, and/or accuracy for use in localization tasks (e.g., retrieval-based localization, benchmarking, etc.)

To solve these and other problems, a ground truth dataset having desirable scale, diversity, and accuracy can be generated by systems and methods according to aspects of the present disclosure. The ground truth dataset can be generated with sufficient scale, diversity, and/or accuracy to satisfy requirements of autonomous vehicle localization. Additionally, the systems and methods can facilitate large-scale annotations, such as granular annotations. For instance, the systems and methods can provide ground truth information accurate to within about ten (10) centimeters without requiring intensive annotation processes, such as manual annotations. With this level of accuracy in the ground truth data, global localization that is determined from such ground truth data can also be achieved within the same accuracy ranges.

As used herein, "about" in conjunction with a stated numerical value is intended to refer to within twenty percent (20%) of the stated value.

According to example aspects of the present disclosure, a computer-implemented method for generating a ground truth dataset can include obtaining (e.g., by a computing system including one or more computing devices) a dense scan including one or more pre-localized sensor observations descriptive of a plurality of ground truth features. For example, in some implementations, the dense scan can be a LIDAR scan (e.g., a dense LIDAR scan). In some implementations, the dense scan can be pre-existing (e.g., the dense scan can be captured independently of and/or prior to generating the ground truth dataset).

Additionally, the method can include obtaining, by the computing system, a plurality of dataset sensor observations of the region. The plurality of dataset sensor observations of the region can be descriptive of the plurality of ground truth features. For example, in some implementations, the plurality of dataset sensor observations can be captured by one or more autonomous vehicles over a plurality of trips and/or diverse conditions.

Additionally, the method can include localizing, based at least in part on vehicle dynamics and LIDAR registration, the plurality of dataset sensor observations against the dense scan to determine a pose of each of the plurality of dataset sensor observations. For instance, the pose can be localized by vehicle dynamics and LIDAR registration against the dense scan. As one example, the dataset sensor observations can be compared to the dense scan and supplemented by vehicle dynamics (e.g., heading and/or coarse position, such as a coarse position from a satellite positioning system) to provide an accurate and relatively low-cost pose annotation of each of the dataset sensor observations. For instance, the dataset sensor observations can be localized by vehicle dynamics from wheel odometers, inertial measurement units, LIDAR readings, etc.

Additionally, the method can include providing (e.g., by the computing system) the plurality of dataset sensor observations and the pose of each of the plurality of dataset sensor observations for retrieval in a ground truth dataset. For example, the pose of each of the plurality of dataset sensor observations can be accessed with reference to a corresponding ground truth dataset sensor observation. In addition to providing the plurality of dataset sensor observations and/or the pose of each of the plurality of dataset sensor observations in the ground truth dataset, in some implementations, the method can additionally include providing one or more granular labels descriptive of each of the plurality of dataset sensor observations. For example, the granular labels can include historical weather and astronomical data. Additionally and/or alternatively, the granular labels can include a degree of occlusion, such as a degree of occlusion determined by a LiDAR and/or image semantic segmentation pipeline.

The systems and methods according to example aspects of the present disclosure can achieve a number of technical effects and benefits. As one example, the systems and methods can facilitate generation of a ground truth dataset having sufficient scope, diversity, and/or accuracy for various localization functions. For instance, the ground truth dataset can provide improved performance of retrieval-based localization, such as a lower error associated with a localized pose. Additionally and/or alternatively, the ground truth dataset can provide improved performance (e.g., more comprehensive tests) as a benchmark for researching and/or testing various localization algorithms. Furthermore, including granular labels can provide for improved classification ability of diverse conditions.

For instance, one example embodiment of a ground truth dataset according to example aspects of the present disclosure can include over 30 million observations, which can include image and/or LIDAR data. The dataset can be captured under diverse conditions and provide accurate ground truth. The dataset can also be annotated with historical weather and astronomical data. Additionally and/or alternatively, the dataset can be annotated with image and LIDAR semantic segmentation (e.g., as a proxy measure for occlusion).

Furthermore, according to example aspects of the present disclosure, a computer-implemented method for determining a pose of a current sensor reading representation can include accessing, by a computing system comprising one or more computing devices, a machine-learned retrieval model. The machine-learned retrieval model can have been trained using a ground truth dataset including a plurality of pre-localized sensor observations. Each of the plurality of pre-localized sensor observations can have a predetermined pose value associated with a previously obtained sensor reading representation. As one example, the ground truth dataset can be generated according to example aspects of the present disclosure to allow for the dataset to include diverse and accurate dataset images over a broad region. For instance, the pre-localized sensor observations can be localized by vehicle dynamics and LIDAR registration against a dense scan of the region depicted by the pre-localized sensor observations, as described herein.

In some implementations, the machine-learned retrieval model can be a convolutional neural network (CNN). In some implementations, the machine-learned retrieval model can be configured according to a localization architecture, such as a pooling method suited for retrieval-based localization, such as VLAD (e.g., NetVLAD).

In some implementations, the machine-learned retrieval model can be trained with respect to a triplet loss function such that a loss between a positive input and an anchor input is less than a threshold and a loss between a negative input and an anchor input is greater than a threshold. In some implementations, for instance, the positive input can be closer to the anchor input than the negative input is by a margin, such as 0.5. For instance, in some implementations, readings within about 1 meter can be positives, and readings within about 2 to 4 meters can be negatives.

Each of the positive input, the negative input, and the anchor input can have an associated heading angle. The heading angles for each of the positive input, the negative input, and the anchor input can be within an angular range, such as about 30 degrees. In some implementations, the positive input and the negative input can be captured along at least one different trip than a trip along which the anchor input is captured. In some implementations, the machine-learned retrieval model can be trained with a triplet for each of the dataset images. In some implementations, the triplet can include normalized embeddings, such as L2-normalized embeddings.

In some implementations, the ground truth dataset can include data spanning a distance of greater than about 20 square kilometers. As another example, in some implementations, the ground truth dataset can include sensor observations that are captured under a variety of differing conditions, such as at least one of weather, season, illumination, construction, occlusion, or dynamic objects. For example, in some implementations, the differing conditions can include at least one of LIDAR occlusion, image occlusion, temperature, cloud cover, precipitation intensity, sun angle over horizon, visibility, UV conditions, precipitation type, and/or trip. Additionally, in some implementations, the ground truth dataset can be annotated with granular labels descriptive of the differing conditions. For example, the ground truth dataset can be annotated with granular labels from at least one of historical weather data, historical astronomical data, and/or degree of occlusion. Including granular labels can better quantify diversity in the ground truth dataset. Furthermore, the granular labels can allow researchers to analyze the failure modes of state-of-the-art localization pipelines.

Additionally and/or alternatively, the computer-implemented method can include obtaining, by the computing system, a current sensor reading representation obtained by one or more sensors located at the vehicle. The current sensor reading representation can include data, such as multisensory data, that is to be localized. For instance, the current sensor reading representation can be or can include one or more images and/or LIDAR data (e.g., sweep, point cloud). For example, in some implementations, the current sensor reading representation can include suitable data captured by one or more sensors disposed on a vehicle, such as an autonomous vehicle. The pose of the current sensor reading representation can thus be associated with the vehicle. For example, the current sensor reading representation can include one or more sensor data points from one or more sensors that generate sensor data relative to an autonomous vehicle.

In some implementations, the sensor data can describe the autonomous vehicle's surrounding environment as well as the position and movement of the autonomous vehicle.

In some implementations, the one or more sensors can include at least one LIDAR sensor and at least one camera. In some implementations, the sensor data can be LIDAR data (e.g., a three-dimensional point cloud) obtained from a LIDAR system. In some implementations, the current sensor reading representation can include image data obtained from one or more cameras. In some implementations, the data can be a birds-eye view representation of data obtained relative to the autonomous vehicle (e.g., birds-eye view voxelated data). For instance, in some implementations, the one or more sensors can include a LIDAR sensor configured to obtain a LIDAR point cloud and the current sensor reading representation can be determined from a multi-channel bird's eye view representation of the LIDAR point cloud that is discretized into a plurality of voxels.

In some implementations, the sensor data can be represented as a multi-dimensional tensor having a height dimension and a time dimension stacked into a channel dimension associated with (e.g., defining) the multi-dimensional tensor. For instance, in some, implementations, each pre-localized sensor observation and the current sensor reading representation can include a vector of features determined from a respective sensor reading.

When a sensor observation includes readings from multiple sensors, the sensor reading representation can combine features obtained from the different sensor readings. For example, a multi-sensor reading representation can include a concatenation of a first vector of features corresponding to data obtained by a first sensor (e.g., a LIDAR sensor) with a second vector of features corresponding to data obtained by a second sensor (e.g., an image sensor or camera). In some implementations, the first vector of features and the second vector of features can be weighted differently dependent based on how current environmental conditions compare to the tagged conditions of the ground truth dataset, thus enhancing the likelihood that a closest match will be determined by a machine-learned retrieval model as described herein.

Additionally and/or alternatively, the computer-implemented method can include inputting, by the computing system, the current sensor reading representation into a machine-learned retrieval model. Additionally and/or alternatively, the computer-implemented method can include receiving, by the computing system and from the machine-learned retrieval model, a determined current pose value for the vehicle based at least in part on one or more of the pre-localized sensor observations determined to be a closest match to the current sensor reading representation. In some implementations, the determined current pose value can have an accuracy of within about one meter. In some implementations, the determined current pose value can have an accuracy of within about ten (10) centimeters. In some implementations, the determined current pose value can include the predetermined pose value of the one or more pre-localized sensor observations determined to be the closest match to the current sensor reading representation.

For example, the machine-learned retrieval model can include a feature detection model. The feature detection model can, in response to receiving the current sensor reading representation as input, identify features in the current sensor reading representation. The features can then be compared (e.g., by a nearest neighbor search) to identify the closest match.

In some embodiments, determining a closest match feature of the plurality of ground truth features can include filtering, from the plurality of candidate features, one or more of the plurality of ground truth features based at least in part on the granular labels. For instance, in some implementations, features greater than a threshold distance from a coarse position measurement (e.g., from a satellite positioning system) of the current sensor reading representation can be filtered from the plurality of candidate features.

For instance, in some implementations, the method can include obtaining, by the computing system, a current GPS estimate for the vehicle. The method can further include determining, by the computing system, a subset of the plurality of pre-localized sensor observations that are within a predetermined threshold distance of the current GPS estimate for the vehicle. The one or more of the pre-localized sensor observations determined to be the closest match to the current sensor reading can be determined from the subset of the plurality of pre-localized sensor observations that are within the predetermined threshold distance of the current GPS estimate for the vehicle.

Additionally and/or alternatively, in some implementations, features can be filtered based on a degree of similarity within the granular labels. For example, the computing system can obtain one or more current sensor reading representation condition measurements indicative of conditions under which the current sensor reading representation is captured. By providing a large dataset with a diversity of condition labels, determining a closest match entry can include determining a closest pose that was previously observed under the most similar conditions as the currently obtained sensor data and/or conditions within some similarity threshold. The current sensor reading representation condition measurements can, for instance, be obtained from sensors on an autonomous vehicle. The features can be filtered such that data from significantly different conditions (e.g., having a difference greater than a threshold for any or all of, for example, light levels, precipitation type, season, construction status, etc.) is filtered from comparison as a closest match feature.

Additionally and/or alternatively, the computer-implemented method can include determining, by the computing system, a pose of the current sensor reading representation based at least in part on a ground truth pose of the closest match feature. For example, the pose of the current sensor reading representation can be determined as the pose of the closest match feature.

Various means can be configured to perform the methods and processes described herein. For example, a computing system can include dense scan obtaining unit(s), sensor observation obtaining unit(s), localizing unit(s), dataset providing unit(s), model accessing unit(s), current sensor reading representation obtaining unit(s), retrieval model unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to a dense scan including one or more pre-localized sensor observations descriptive of a plurality of ground truth features. For example, in some implementations, the dense scan can be a LIDAR scan (e.g., a dense LIDAR scan). In some implementations, the dense scan can be pre-existing (e.g., the dense scan can be captured independently of and/or prior to generating the ground truth dataset). A dense scan obtaining unit is one example of a means for obtaining the dense scan as described herein.

The means can be configured to obtain a plurality of dataset sensor observations of the region. The plurality of dataset sensor observations of the region can be descriptive of the plurality of ground truth features. For example, in some implementations, the plurality of dataset sensor observations can be captured by one or more autonomous vehicles over a plurality of trips and/or diverse conditions. A sensor observation obtaining unit is one example of a means for obtaining the plurality of dataset sensor observations as described herein.

The means can be configured to localize, based at least in part on vehicle dynamics and LIDAR registration, the plurality of dataset sensor observations against the dense scan to determine a pose of each of the plurality of dataset sensor observations. For instance, the pose can be localized by vehicle dynamics and LIDAR registration against the dense scan. As one example, the dataset sensor observations can be compared to the dense scan and supplemented by vehicle dynamics (e.g., heading and/or coarse position, such as a coarse position from a satellite positioning system) to provide an accurate and relatively low-cost pose annotation of each of the dataset sensor observations. For instance, the dataset sensor observations can be localized by vehicle dynamics from wheel odometers, inertial measurement units, LIDAR readings, etc. A localizing unit is one example of a means for localizing the plurality of dataset sensor observations as described herein.

The means can be configured to access (e.g., by a computing system comprising one or more computing devices) a machine-learned retrieval model that has been trained using a ground truth dataset comprising a plurality of pre-localized sensor observations. Each of the plurality of pre-localized sensor observations can have a predetermined pose value associated with a previously obtained sensor reading representation. For instance, the means can retrieve the ground truth dataset from a server computing system and/or a local computing system. A model accessing unit is one example of a means for accessing the machine-learned retrieval model as described herein.

The means can be configured to obtain a current sensor reading representation. For instance, the means can be configured to obtain a current sensor reading representation including sensor data, such as including one or more sensor data points from one or more sensors that generate sensor data relative to an autonomous vehicle. In some implementations, the means can be configured to obtain sensor data associated with (e.g., describing) the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with (e.g., defining) the multi-dimensional tensor. A current sensor reading representation obtaining unit is one example of a means for obtaining one or more current sensor reading representations as described herein.

The means can be configured to input the current sensor reading representation into the machine-learned retrieval model. The means can be configured to receive, from the machine-learned retrieval model, a determined current pose value for the vehicle based at least in part on one or more of the pre-localized sensor observations determined to be a closest match to the current sensor reading representation. The determined current pose value can have an accuracy of within about one meter. A retrieval model unit is one example of a means for determining a current pose value as described herein.

With reference now to the figures, example implementations of the present disclosure will be discussed in further detail.

FIG. 1 illustrates an example vehicle computing system 100 according to example implementations of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, lightweight electric vehicle (e.g., scooter, bicycle, etc.), and/or other types of ground vehicles. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105. For example, a collision mitigation system can utilize a predicted intention of objects within the vehicle's 105 surrounding environment to assist an operator 106 in avoiding collisions and/or delays even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 195, as disclosed herein. By way of example, such data communicated to a vehicle 105 by the operations computing system 195 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining object intentions based on physical attributes.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire the sensor data 140. This can include sensor data associated with the surrounding environment of the vehicle 105. For instance, the sensor data 140 can include image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the vehicle 105. In some implementations, the vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, the perception system 155, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. In some implementations, the prediction data 175 can include a predicted object intention (e.g., a right turn) based on physical attributes of the object. The prediction system 160 can output the prediction data 175 (e.g., indicative of one or more of the predicted motion trajectories) to the motion planning system 165. In some implementations, the functions the perception system 155 and the prediction system 160 can be included within the same system and/or share one or more computing resources.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), intention, other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 X degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle 105 can include an HMI (Human Machine Interface) 190 that can output data and accept input from the operator 106 of the vehicle 105. For instance, the HMI 190 can include one or more output devices (e.g., speakers, display devices, tactile devices, etc.) such that, in some implementations, the HMI 190 can provide one or more informational prompts to the operator 106 of the vehicle 105. For example, the HMI 190 can be configured to provide prediction data 170 such as a predicted object intention to one or more vehicle operator(s) 106. Additionally, or alternatively, the HMI 190 can include one or more input devices (e.g., buttons, microphones, cameras, etc.) to accept vehicle operator 106 input. In this manner, the HMI 190 can communicate with the vehicle operator 106.

Figure 2:
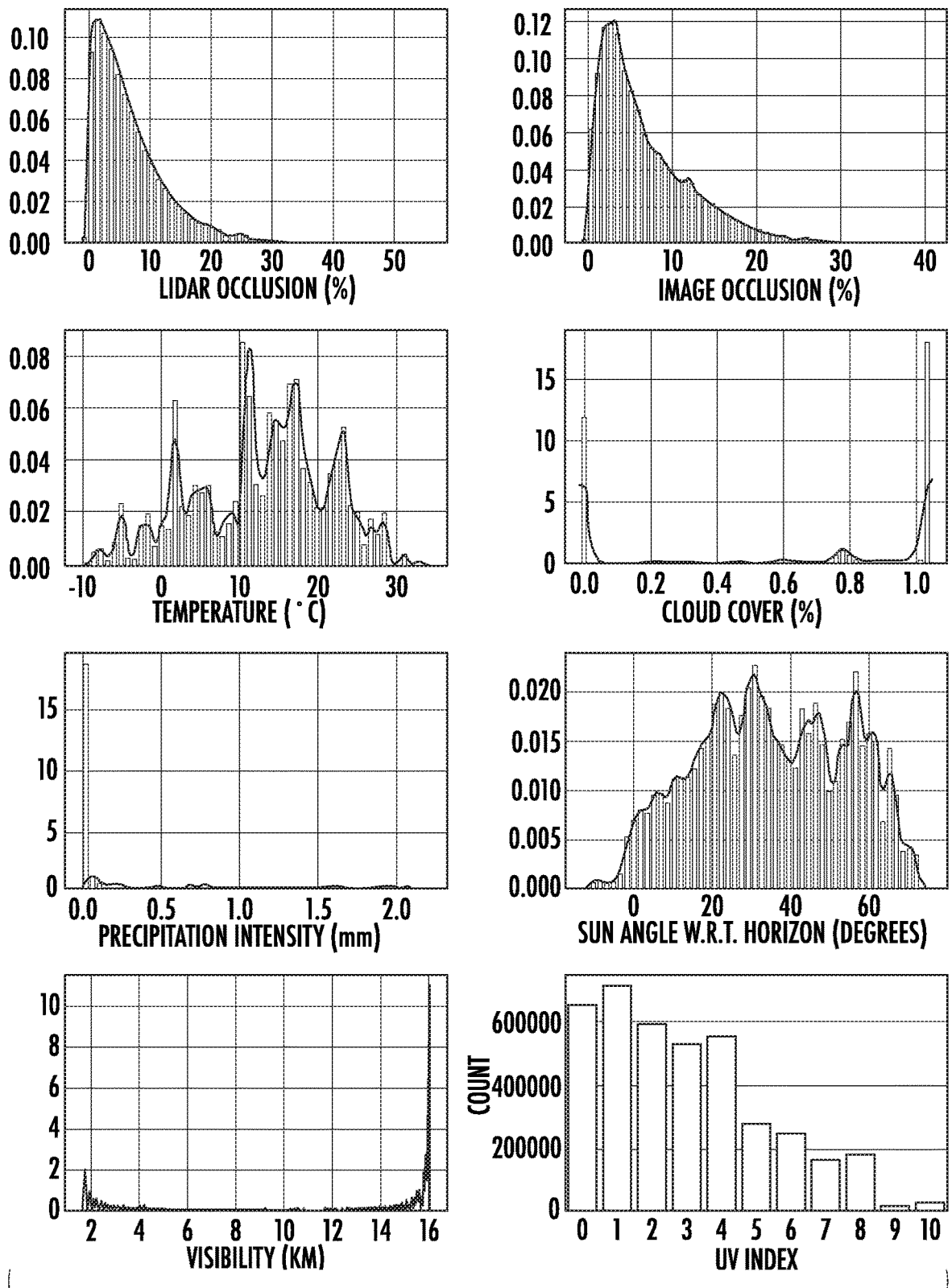
FIG. 2 depicts example diversity distributions according to example implementations of the present disclosure.

FIG. 2 depicts example diversity distributions according to example implementations of the present disclosure. For example, FIG. 2 depicts example diversity distributions that can provide satisfactory localization performance according to example aspects of the present disclosure. For instance, FIG. 2 depicts probability density functions of example labels including LIDAR occlusion percentage, image occlusion percentage, temperature, cloud cover percentage, precipitation intensity, sun angle from horizon, visibility, and UV index for data inside one example dataset according to example aspects of the present disclosure. As illustrated in FIG. 2, diverse conditions can be non-uniform. For instance, as depicted in the graph of the precipitation intensity, a majority of the dataset can be captured under conditions having little to no precipitation. However, diverse data including data captured under conditions having greater amounts of precipitation is included in the dataset. The probability density functions depicted in FIG. 2 help to quantify the advantageous diversity of a dataset generated and employed in accordance with the disclosed techniques.

Figure 3A:
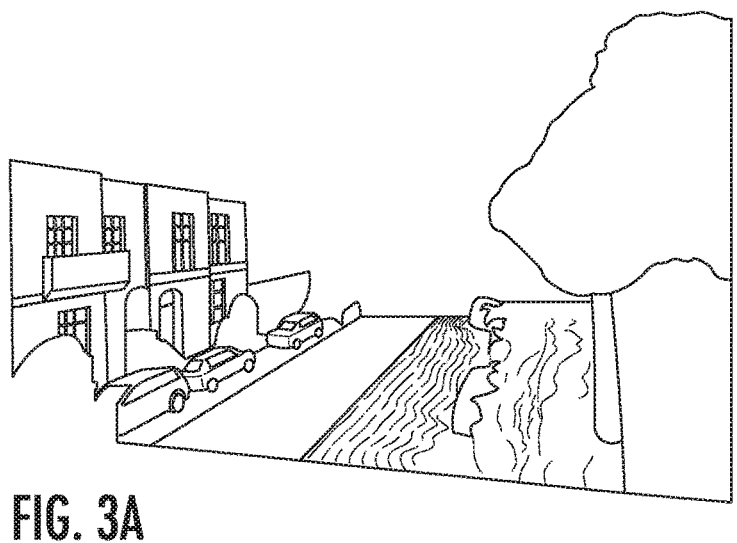
FIGS. 3A-3C depict example voxelization techniques according to example implementations of the present disclosure.
Figure 3B:
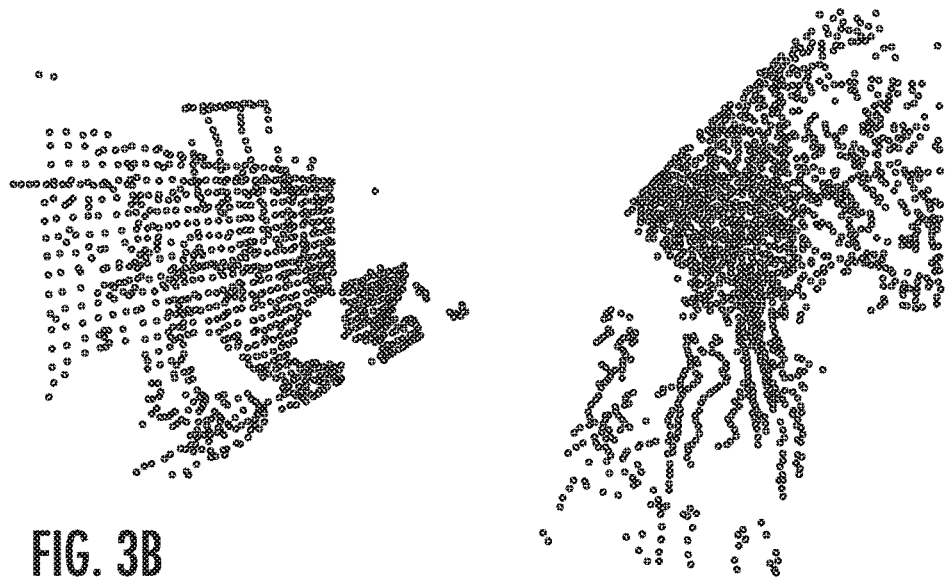
Figure 3C:
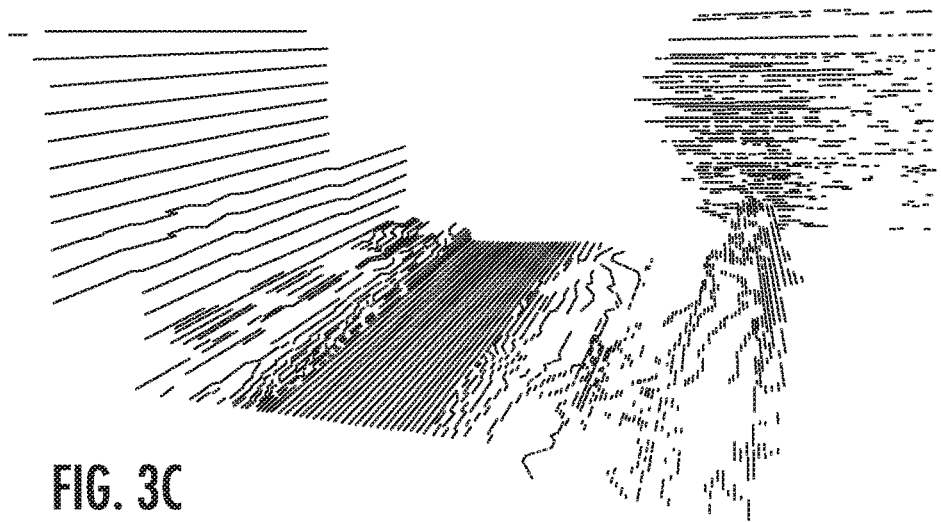

FIGS. 3A-3C depict example voxelization techniques according to example implementations of the present disclosure. For example, FIG. 3A depicts a raw point cloud of an environment. For instance, the raw point cloud may include LIDAR data that is composited from one or more LIDAR sensors (e.g., without any form of voxelization used to voxelate the data). FIG. 3B depicts a point cloud (e.g., the point cloud of FIG. 3A) after downsampling (e.g., coarse voxelization) and ground plane removal. FIG. 3C depicts a point cloud (e.g., the point cloud of FIG. 3A) after birds-eye view (BEV) voxelization. In some embodiments of the disclosed technology, sensor readings can be transformed into representations such as depicted in one or more of FIGS. 3A-3C. For instance, a current sensor reading representation can be determined from a multi-channel bird's eye view representation of a LIDAR point cloud that is discretized into a plurality of voxels. Performance testing of the disclosed techniques has shown that bird's-eye view voxelization coupled with a strong convolutional backbone in the disclosed machine-learned retrieval models can achieve improved localization results compared with other pointcloud representations.

Figure 4:
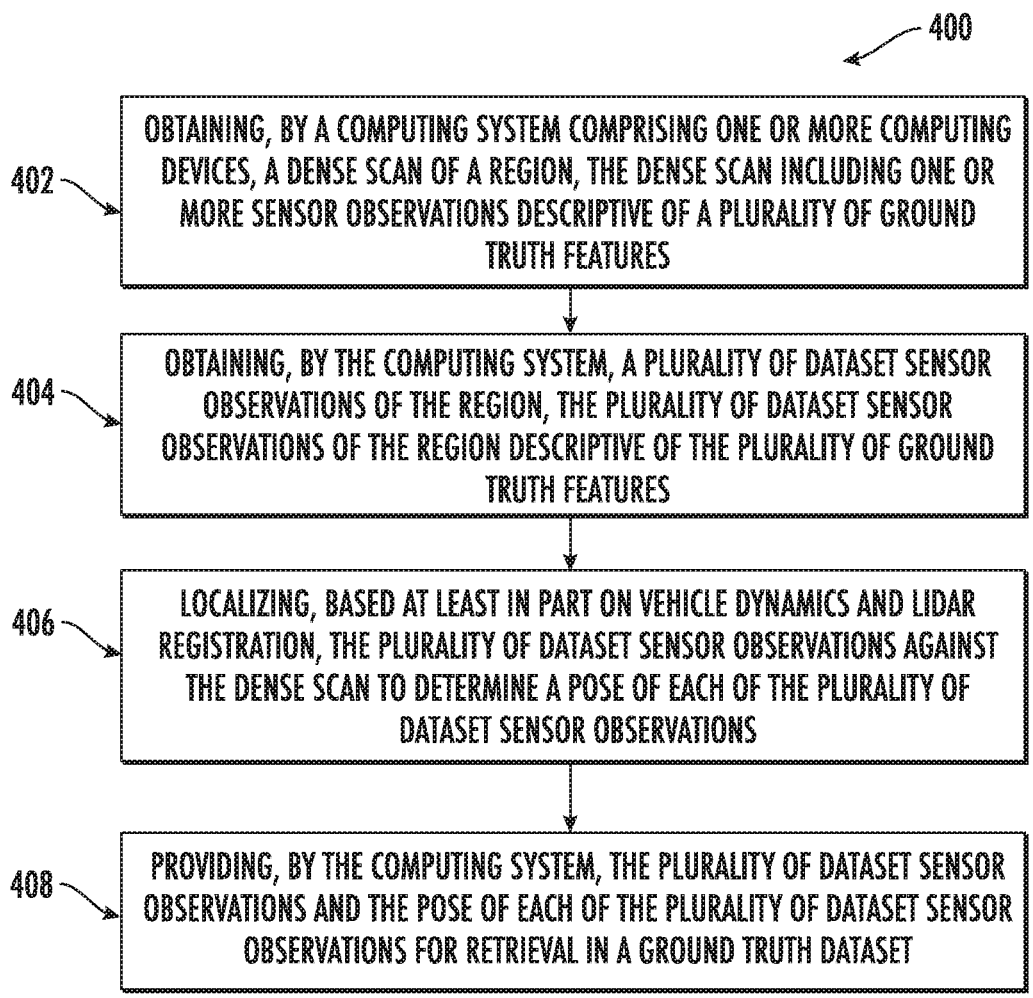
FIG. 4 depicts an example method of generating a ground truth dataset according to example implementations of the present disclosure.

FIG. 4 depicts an example method 400 of generating a ground truth dataset according to example implementations of the present disclosure. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 400 can include, at 402, obtaining, by a computing system comprising one or more computing devices, a dense scan of a region. The dense scan can include one or more sensor observations descriptive of a plurality of ground truth features. For example, in some implementations, the dense scan can be a LIDAR scan (e.g., a dense LIDAR scan). In some implementations, the dense scan can be pre-existing (e.g., the dense scan can be captured independently of and/or prior to generating the ground truth dataset).

The method 400 can include, at 404, obtaining, by the computing system, a plurality of dataset sensor observations of the region. The plurality of dataset sensor observations of the region can be descriptive of the plurality of ground truth features. For example, in some implementations, the plurality of dataset sensor observations can be captured by one or more autonomous vehicles over a plurality of trips and/or diverse conditions.

The method 400 can include, at 406, localizing, based at least in part on vehicle dynamics and LIDAR registration, the plurality of dataset sensor observations against the dense scan to determine a pose of each of the plurality of dataset sensor observations. For instance, the pose can be localized by vehicle dynamics and LIDAR registration against the dense scan. As one example, the dataset sensor observations can be compared to the dense scan and supplemented by vehicle dynamics (e.g., heading and/or coarse position, such as a coarse position from a satellite positioning system) to provide an accurate and relatively low-cost pose annotation of each of the dataset sensor observations. For instance, the dataset sensor observations can be localized by vehicle dynamics from wheel odometers, inertial measurement units, LIDAR readings, etc.

The method 400 can include, at 408, providing (e.g., by the computing system) the plurality of dataset sensor observations and the pose of each of the plurality of dataset sensor observations for retrieval in a ground truth dataset. For example, the pose of each of the plurality of dataset sensor observations can be accessed with reference to a corresponding ground truth dataset sensor observation. In addition to providing the plurality of dataset sensor observations and/or the pose of each of the plurality of dataset sensor observations in the ground truth dataset, in some implementations, the method can additionally include providing one or more granular labels descriptive of each of the plurality of dataset sensor observations. For example, the granular labels can include historical weather and astronomical data. Additionally and/or alternatively, the granular labels can include a degree of occlusion, such as a degree of occlusion determined by a LiDAR and/or image semantic segmentation pipeline.

Figure 5:
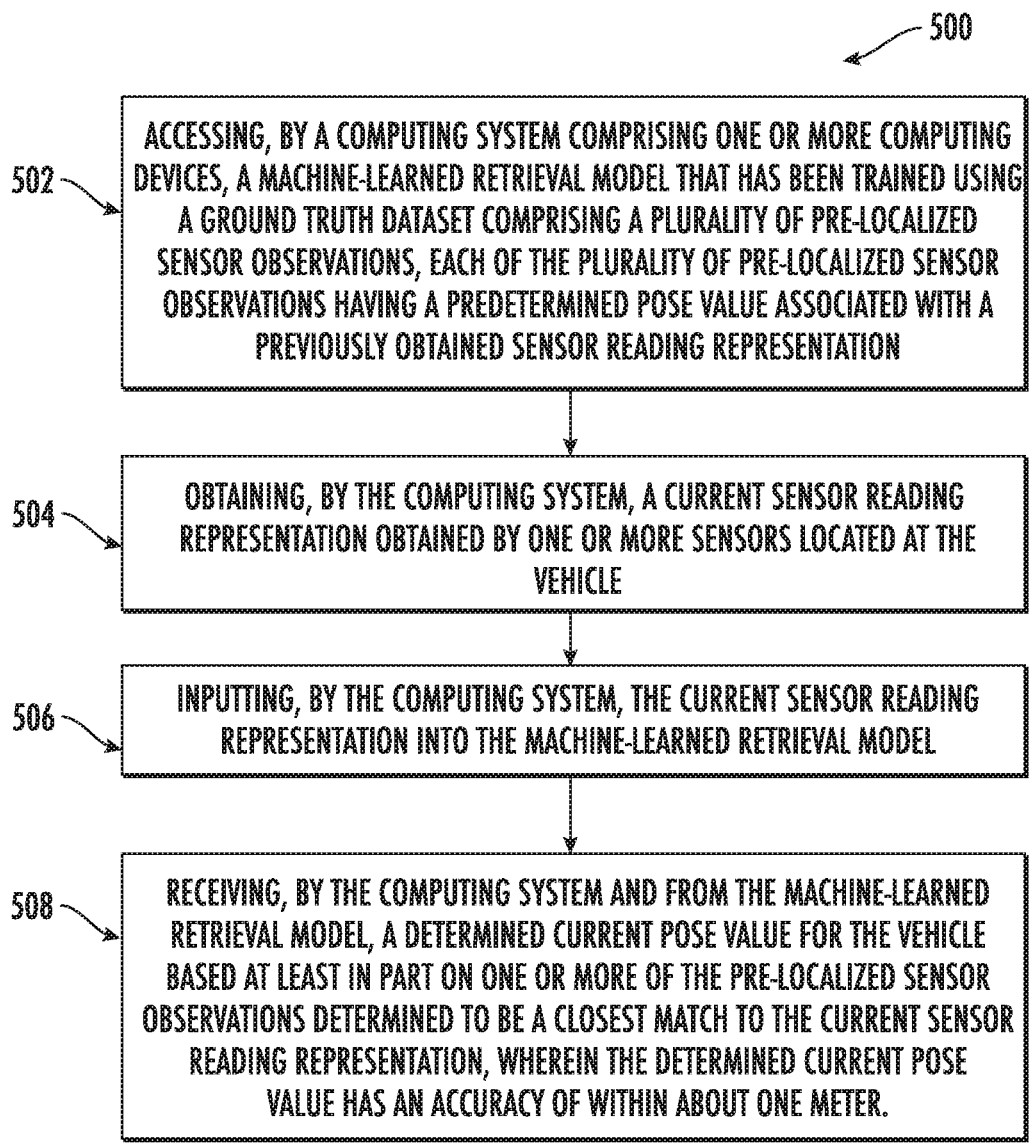
FIG. 5 depicts an example method of determining pose of a current sensor reading representation according to example implementations of the present disclosure.

FIG. 5 depicts an example method 500 of determining pose of a current sensor reading representation according to example implementations of the present disclosure. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 500 can include, at 502, accessing, by a computing system comprising one or more computing devices, a machine-learned retrieval model. The machine-learned retrieval model can have been trained using a ground truth dataset including a plurality of pre-localized sensor observations. Each of the plurality of pre-localized sensor observations can have a predetermined pose value associated with a previously obtained sensor reading representation. As one example, the ground truth dataset can be generated according to example aspects of the present disclosure to allow for the dataset to include diverse and accurate dataset images over a broad region. For instance, the pre-localized sensor observations can be localized by vehicle dynamics and LIDAR registration against a dense scan of the region depicted by the pre-localized sensor observations, as described herein.

In some implementations, the machine-learned retrieval model can be a convolutional neural network (CNN). In some implementations, the machine-learned retrieval model can be configured according to a localization architecture, such as a pooling method suitable for retrieval-based localization, such as VLAD (e.g., NetVLAD).

In some implementations, the machine-learned retrieval model can be trained with respect to a triplet loss function such that a loss between a positive input and an anchor input is less than a threshold and a loss between a negative input and an anchor input is greater than a threshold. In some implementations, for instance, the positive input can be closer to the anchor input than the negative input is by a margin, such as 0.5. For instance, in some implementations, readings within about 1 meter can be positives, and readings within about 2 to 4 meters can be negatives.

Each of the positive input, the negative input, and the anchor input can have an associated heading angle. The heading angles for each of the positive input, the negative input, and the anchor input can be within an angular range, such as about 30 degrees. In some implementations, the positive input and the negative input can be captured along at least one different trip than a trip along which the anchor input is captured. In some implementations, the machine-learned retrieval model can be trained with a triplet for each the dataset images. In some implementations, the triplet can include normalized embeddings, such as L2-normalized embeddings.

In some implementations, the ground truth dataset can include data spanning a distance of greater than about 20 square kilometers. As another example, in some implementations, the ground truth dataset can include sensor observations that are captured under a variety of differing conditions, such as at least one of weather, season, illumination, construction, occlusion, or dynamic objects. For example, in some implementations, the differing conditions can include at least one of LIDAR occlusion, image occlusion, temperature, cloud cover, precipitation intensity, sun angle over horizon, visibility, UV conditions, precipitation type, and/or trip. Additionally, in some implementations, the ground truth dataset can be annotated with granular labels descriptive of the differing conditions. For example, the ground truth dataset can be annotated with granular labels from at least one of historical weather data, historical astronomical data, and/or degree of occlusion. Including granular labels can better quantify diversity in the ground truth dataset. Furthermore, the granular labels can allow researchers to analyze the failure modes of state-of-the-art localization pipelines.

The method 500 can include, at 504, obtaining, by the computing system, a current sensor reading representation obtained by one or more sensors located at the vehicle. The current sensor reading representation can include data, such as multisensory data, that is to be localized. For instance, the current sensor reading representation can be or can include one or more images and/or LIDAR data (e.g., sweep, point cloud). For example, in some implementations, the current sensor reading representation can include suitable data captured by one or more sensors disposed on a vehicle, such as an autonomous vehicle. The pose of the current sensor reading representation can thus be associated with the vehicle. For example, the current sensor reading representation can include one or more sensor data points from one or more sensors that generate sensor data relative to an autonomous vehicle.

In some implementations, the sensor data can describe the autonomous vehicle's surrounding environment as well as the position and movement of the autonomous vehicle.

In some implementations, the one or more sensors can include at least one LIDAR sensor and at least one camera. In some implementations, the sensor data can be LIDAR data (e.g., a three-dimensional point cloud) obtained from a LIDAR system. In some implementations, the current sensor reading representation can include image data obtained from one or more cameras. In some implementations, the data can be a birds-eye view representation of data obtained relative to the autonomous vehicle (e.g., birds-eye view voxelated data). For instance, in some implementations, the one or more sensors can include a LIDAR sensor configured to obtain a LIDAR point cloud and the current sensor reading representation can be determined from a multi-channel bird's eye view representation of the LIDAR point cloud that is discretized into a plurality of voxels.

In some implementations, the sensor data can be represented as a multi-dimensional tensor having a height dimension and a time dimension stacked into a channel dimension associated with (e.g., defining) the multi-dimensional tensor. For instance, in some, implementations, each pre-localized sensor observation and the current sensor reading representation can include a vector of features determined from a respective sensor reading.

When a sensor observation includes readings from multiple sensors, the sensor reading representation can combine features obtained from the different sensor readings. For example, a multi-sensor reading representation can include a concatenation of a first vector of features corresponding to data obtained by a first sensor (e.g., a LIDAR sensor) with a second vector of features corresponding to data obtained by a second sensor (e.g., an image sensor or camera). In some implementations, the first vector of features and the second vector of features can be weighted differently based on how current environmental conditions compare to the tagged conditions of the ground truth dataset, thus enhancing the likelihood that a closest match will be determined by a machine-learned retrieval model as described herein.

The method 500 can include, at 506, inputting, by the computing system, the current sensor reading representation into a machine-learned retrieval model. Additionally and/or alternatively, the method 500 can include, at 508, receiving, by the computing system and from the machine-learned retrieval model, a determined current pose value for the vehicle based at least in part on one or more of the pre-localized sensor observations determined to be a closest match to the current sensor reading representation. In some implementations, the determined current pose value can have an accuracy of within about one meter. In some implementations, the determined current pose value can have an accuracy of within about ten (10) centimeters. In some implementations, the determined current pose value can include the predetermined pose value of the one or more pre-localized sensor observations determined to be the closest match to the current sensor reading representation. In some implementations, the determined current pose value can be triangulated or otherwise adjusted from one or more predetermined pose value of the one or more pre-localized sensor observations determined to most closely match the current sensor reading representations.

For example, the machine-learned retrieval model can include a feature detection model. The feature detection model can, in response to receiving the current sensor reading representation as input, identify features in the current sensor reading representation. The features can then be compared (e.g., by a nearest neighbor search) to identify the closest match.

In some embodiments, determining a closest match feature of the plurality of ground truth features can include filtering, from the plurality of candidate features, one or more of the plurality of ground truth features based at least in part on the granular labels. For instance, in some implementations, features greater than a threshold distance from a coarse position measurement (e.g., from a satellite positioning system) of the current sensor reading representation can be filtered from the plurality of candidate features.

For instance, in some implementations, the method 500 can include obtaining, by the computing system, a current GPS estimate for the vehicle. The method can further include determining, by the computing system, a subset of the plurality of pre-localized sensor observations that are within a predetermined threshold distance of the current GPS estimate for the vehicle. The one or more of the pre-localized sensor observations determined to be the closest match to the current sensor reading can be determined from the subset of the plurality of pre-localized sensor observations that are within the predetermined threshold distance of the current GPS estimate for the vehicle.

Additionally and/or alternatively, in some implementations, features can be filtered based on a degree of similarity within the granular labels. For example, the computing system can obtain one or more current sensor reading representation condition measurements indicative of conditions under which the current sensor reading representation is captured. By providing a large dataset with a diversity of condition labels, determining a closest match entry can include determining a closest pose that was previously observed under the most similar conditions as the currently obtained sensor data and/or conditions within some similarity threshold. The current sensor reading representation condition measurements can, for instance, be obtained from sensors on an autonomous vehicle. The features can be filtered such that data from significantly different conditions (e.g., having a difference greater than a threshold for any or all of, for example, light levels, precipitation type, season, construction status, etc.) is filtered from comparison as a closest match feature.

For example, in some implementations, the method 500 can include determining, by the computing system, a pose of the current sensor reading representation based at least in part on a ground truth pose of the closest match feature. For example, the pose of the current sensor reading representation can be determined as the pose of the closest match feature.

Figure 6:
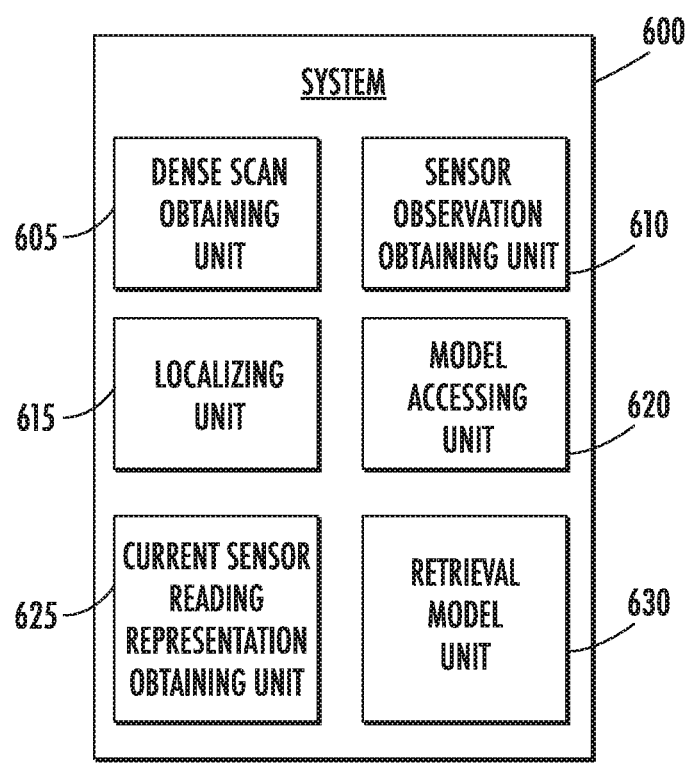
FIG. 6 depicts an example computing system according to example implementations of the present disclosure.

Various means can be configured to perform the methods and processes described herein. For example, FIG. 6 depicts a block diagram of an example computing system 600 configured to perform the methods and processes as described herein. For example, the computing system 600 can include dense scan obtaining unit(s) 605, sensor observation obtaining unit(s) 610, localizing unit(s) 615, model accessing unit(s) 620, current sensor reading representation obtaining unit(s) 625, retrieval model unit(s) 630, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to a dense scan including one or more pre-localized sensor observations descriptive of a plurality of ground truth features. For example, in some implementations, the dense scan can be a LIDAR scan (e.g., a dense LIDAR scan). In some implementations, the dense scan can be pre-existing (e.g., the dense scan can be captured independently of and/or prior to generating the ground truth dataset). A dense scan obtaining unit 605 is one example of a means for obtaining the dense scan as described herein.

The means can be configured to a obtain a plurality of dataset sensor observations of the region. The plurality of dataset sensor observations of the region can be descriptive of the plurality of ground truth features. For example, in some implementations, the plurality of dataset sensor observations can be captured by one or more autonomous vehicles over a plurality of trips and/or diverse conditions. A sensor observation obtaining unit 610 is one example of a means for obtaining the plurality of dataset sensor observations as described herein.

The means can be configured to localize, based at least in part on vehicle dynamics and LIDAR registration, the plurality of dataset sensor observations against the dense scan to determine a pose of each of the plurality of dataset sensor observations. For instance, the pose can be localized by vehicle dynamics and LIDAR registration against the dense scan. As one example, the dataset sensor observations can be compared to the dense scan and supplemented by vehicle dynamics (e.g., heading and/or coarse position, such as a coarse position from a satellite positioning system) to provide an accurate and relatively low-cost pose annotation of each of the dataset sensor observations. For instance, the dataset sensor observations can be localized by vehicle dynamics from wheel odometers, inertial measurement units, LIDAR readings, etc. A localizing unit 615 is one example of a means for localizing the plurality of dataset sensor observations as described herein.

The means can be configured to access (e.g., by a computing system comprising one or more computing devices) a machine-learned retrieval model that has been trained using a ground truth dataset comprising a plurality of pre-localized sensor observations. Each of the plurality of pre-localized sensor observations can have a predetermined pose value associated with a previously obtained sensor reading representation. For instance, the means can retrieve the ground truth dataset from a server computing system and/or a local computing system. A model accessing unit 620 is one example of a means for accessing the machine-learned retrieval model as described herein.

The means can be configured to obtain a current sensor reading representation. For instance, the means can be configured to obtain a current sensor reading representation including sensor data, such as including one or more sensor data points from one or more sensors that generate sensor data relative to an autonomous vehicle. In some implementations, the means can be configured to obtain sensor data associated with (e.g., describing) the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with (e.g., defining) the multi-dimensional tensor. A current sensor reading representation obtaining unit 625 is one example of a means for obtaining one or more current sensor reading representations as described herein.

The means can be configured to input the current sensor reading representation into the machine-learned retrieval model. The means can be configured to receive, from the machine-learned retrieval model, a determined current pose value for the vehicle based at least in part on one or more of the pre-localized sensor observations determined to be a closest match to the current sensor reading representation. The determined current pose value can have an accuracy of within about one meter. A retrieval model unit 630 is one example of a means for determining a current pose value as described herein.

FIG. 7 depicts example system components of an example system 1000 according to example embodiments of the present disclosure. The example system 1000 can be or include the vehicle computing system 100 of FIG. 1, the operations computing system 195 of FIG. 1, etc. that are communicatively coupled over one or more network(s) 1080.

The vehicle computing system 100 of FIG. 1 can include one or more computing system(s) 1002. The computing system(s) 1002 can include processor(s) 1012 and a memory 1014 (e.g., onboard the vehicle 105). The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processor(s) 1012. For instance, the memory 1014 (e.g., one or more non-transitory computer-readable storage mediums, memory devices) can include computer-readable instructions 1018 that can be executed by the one or more processor(s) 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processor(s) 1012 cause the one or more processor(s) 1012 (e.g., of the computing system 100) to perform operations such as any of the operations and functions of the vehicle computing system 100, the vehicle 105, or for which the vehicle computing system 100 and/or the vehicle 105 are configured, as described herein, the operations for training one or more machine-learned models, receiving/storing state data for one or more object, predicting object trajectories and/or controlling an autonomous vehicle (e.g., one or more portions of method 400 and/or 500), and/or any other functions for the vehicle computing system 100, as described herein.

The memory 1014 can store data 1016 that can be obtained, received, accessed, written, manipulated, created, and/or stored. The data 1016 can include, for instance, sensor data, state data, predicted data, data associated with a geographic area, input data, data indicative of machine-learned model(s), data indicative of model outputs, motion planning data, training data and/or other data/information described herein. In some implementations, the computing system(s) 1002 can obtain from and/or store data in one or more memory device(s) that are remote from the vehicle 105 such as one or more memory device of the training computing system.

The computing system(s) 1002 can also include a network interface 1024 used to communicate with one or more other system(s) on-board the vehicle 105 and/or a remote computing device that is remote from the vehicle 105 (e.g., the other systems of FIG. 1, etc.). The network interface 1024 can include any circuits, components, software, etc. for communicating via one or more networks (e.g., 1080). In some implementations, the network interface 1024 can include for example, one or more of a communications controller, receiver, transceiver, transmitter, port, conductors, software and/or hardware for communicating data/information.

The operations computing system 195 can perform the operations and functions for managing vehicles (e.g., a fleet of autonomous vehicles). The operations computing system 195 can be located remotely from the vehicle. For example, the operations computing system 195 can operate offline, off-board, etc. The operations computing system 195 can include one or more distinct physical computing devices.

The operations computing system 195 can include one or more machine-learning computing system(s) 1030. The one or more machine-learning computing system(s) 1030 can include one or more processor(s) 1032 and a memory 1034. The one or more processor(s) 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof.

The memory 1034 can store information that can be accessed by the one or more processor(s) 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, training data such as one or more observations of one or more training objects, data indicative of one or more machine-learned model(s), map data, data associated with a geographic area, and/or other data or information described herein. In some implementations, the operations computing system 195 can obtain data from one or more memory device(s) that are remote from the operations computing system 195.

The memory 1034 can also store computer-readable instructions 1038 that can be executed by the one or more processor(s) 1032. The instructions 1038 can be software written in any suitable programming language or can be implemented in hardware. Additionally, or alternatively, the instructions 1038 can be executed in logically and/or virtually separate threads on processor(s) 1032. For example, the memory 1034 can store instructions 1038 that when executed by the one or more processor(s) 1032 cause the one or more processor(s) 1032 to perform any of the operations and/or functions described herein, including, for example, any of the operations and functions of the operations computing system 195, as well as one or more portions of methods 400, 500, and/or other operations and functions.

The machine-learning computing system(s) 1030 can also include a network interface 1064 used to communicate with one or more other system(s). The network interface 1064 can include any circuits, components, software, etc. for communicating via one or more networks (e.g., 1080). In some implementations, the network interface 1064 can include for example, one or more of a communications controller, receiver, transceiver, transmitter, port, conductors, software and/or hardware for communicating data/information.

According to an aspect of the present disclosure, the vehicle computing system 100 and/or the operations computing system 195 can store or include one or more machine-learned models 1040. As examples, the machine-learned models 1040 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks.

In some implementations, the vehicle computing system 100 and/or the operations computing system 195 can receive one or more of the machine-learned models 1040 from the training computing system 1030 over the network(s) 1080 and can store the one or more machine-learned models 1040 in the memory of the respective system. The vehicle computing system 100 and/or the operations computing system 195 can use or otherwise implement the one or more machine-learned models 1040 (e.g., by processor(s) 1012).

The training computing system 1030 can include one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. In some implementations, the training computing system 1030 can obtain data from one or more memory devices that are remote from the system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032. The memory 1034 can store the instructions 1038 that when executed by the one or more processors 1032 cause the one or more processors 1032 to perform operations. The training computing system 1030 can include a communication system 1039, similar to that of the vehicle computing system 100 and/or the operations computing system 195.

In some implementations, the training computing system 1030 can include one or more server computing devices. If the training computing system 1030 includes multiple server computing devices, such server computing devices can operate according to various computing architectures, including, for example, sequential computing architectures, parallel computing architectures, or some combination thereof.

The network(s) 1080 can be any type of network or combination of networks that allows for communication between devices. In some embodiments, the network(s) 1080 can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 7 illustrates one example system 1000 that can be used to implement the present disclosure. Other computing systems can be used as well. For example, in some implementations, the vehicle computing system 100 and/or the operations computing system 195 can include the model trainer 1060 and the training dataset 1062. In such implementations, the machine-learned models 1040 can be both trained and used locally at the vehicle computing system 100 and/or the operations computing system 195. As another example, in some implementations, the vehicle computing system 100 and/or the operations computing system 195 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for localizing a vehicle, the computer-implemented method comprising:
   accessing one or more computing devices, a machine-learned retrieval model that has been trained using a ground truth dataset comprising a plurality of pre-localized sensor observations, respective pre-localized sensor observations having a predetermined pose value associated with a previously obtained sensor reading representation;
   obtaining a current sensor reading representation obtained by one or more sensors located at the vehicle;
   inputting the current sensor reading representation into the machine-learned retrieval model;
   receiving from the machine-learned retrieval model, a determined current pose value for the vehicle based at least in part on one or more pre-localized sensor observations of the plurality of pre-localized sensor observations determined to be a closest match to the current sensor reading representation, wherein the determined current pose value has an accuracy of within about one meter;
   obtaining a current GPS estimate for the vehicle; and
   determining a subset of the plurality of pre-localized sensor observations that are within a predetermined threshold distance of the current GPS estimate for the vehicle; and
   wherein the one or more of the pre-localized sensor observations determined to be the closest match to the current sensor reading are determined from the subset of the plurality of pre-localized sensor observations that are within the predetermined threshold distance of the current GPS estimate for the vehicle.

2. The computer-implemented method of claim 1, wherein the determined current pose value comprises the predetermined pose value of the one or more pre-localized sensor observations determined to be the closest match to the current sensor reading representation.

3. The computer-implemented method of claim 1, wherein each pre-localized sensor observation and the current sensor reading representation comprises a vector of features determined from a respective sensor reading.

4. The computer-implemented method of claim 1, wherein the one or more sensors comprises at least one of one or more LIDAR sensors or one or more cameras.

5. The computer-implemented method of claim 1, wherein:
   the one or more sensors comprises a LIDAR sensor configured to obtain a LIDAR point cloud; and
   the current sensor reading representation is determined from a multi-channel bird's eye view representation of the LIDAR point cloud that is discretized into a plurality of voxels.

6. The computer-implemented method of claim 1, wherein the machine-learned retrieval model is trained with respect to a triplet loss function determined for each pre-localized sensor observation in the ground truth dataset, the triplet loss function defined in terms of a positive input, an anchor input, and a negative input, wherein a first threshold for comparing the positive input to the anchor input is less than a second threshold for comparing the negative input to the anchor input.

7. The computer-implemented method of claim 6, wherein each of the positive input, the negative input, and the anchor input have an associated heading angle, and wherein the heading angles for each of the positive input, the negative input and the anchor input are within a predetermined angular range.

8. The computer-implemented method of claim 6, wherein the positive input and the negative input are captured along at least one different trip than a trip along which the anchor input is captured.

9. The computer-implemented method of claim 1, wherein the determined current pose value has an accuracy within about 10 centimeters.

10. The computer-implemented method of claim 1, wherein the ground truth dataset comprises pre-localized sensor observations taken under differing conditions of at least one of weather, season, illumination, construction, occlusion, or dynamic objects.

11. The computer-implemented method of claim 10, wherein the differing conditions comprise at least one of LIDAR occlusion, image occlusion, temperature, cloud cover, precipitation intensity, sun angle over horizon, visibility, UV conditions, precipitation type, or trip.

12. The computer-implemented method of claim 1, wherein the pre-localized sensor observations are localized by vehicle dynamics and LIDAR registration against a dense scan of a region.

13. The computer-implemented method of claim 1, wherein the ground truth dataset is annotated with granular labels from at least one of historical weather data, historical astronomical data, or degree of occlusion.

14. The computer-implemented method of claim 13, further comprising filtering, from the plurality of candidate features, one or more of the plurality of ground truth features based at least in part on the granular labels.

15. A computer-implemented method for generating a ground truth dataset, the computer-implemented method comprising:
  obtaining, by a computing system comprising one or more computing devices, a dense scan of a region, the dense scan comprising one or more sensor observations descriptive of a plurality of ground truth features;
  obtaining, by the computing system, a plurality of dataset sensor observations of the region, the plurality of dataset sensor observations of the region descriptive of the plurality of ground truth features,
  localizing, based at least in part on vehicle dynamics and LIDAR registration, the plurality of dataset sensor observations against the dense scan to determine a pose of each of the plurality of dataset sensor observations; and
  providing, by the computing system, the plurality of dataset sensor observations and the pose of each of the plurality of dataset sensor observations for retrieval in a ground truth dataset, wherein the ground truth dataset is configured for access by an autonomous vehicle to subsequently determine real-time localization.

16. The computer-implemented method of claim 15, wherein the dense scan comprises a LIDAR scan.

17. The computer-implemented method of claim 15, wherein the plurality of dataset sensor observations are captured under differing conditions, and wherein the differing conditions comprise at least one of LIDAR occlusion, image occlusion, temperature, cloud cover, precipitation intensity, sun angle over horizon, visibility, UV conditions, precipitation type, or trip.

18. The computer-implemented method of claim 15, wherein the method further comprises:
  accessing, by the computing system, a machine-learned retrieval model that has been trained using the ground truth dataset;
  obtaining, by the computing system, a current sensor reading representation obtained by one or more sensors located at the vehicle;
  inputting, by the computing system, the current sensor reading representation into the machine-learned retrieval model; and
  receiving, by the computing system and from the machine-learned retrieval model, a determined current pose value for the vehicle based at least in part on one or more of the pre-localized sensor observations determined to be a closest match to the current sensor reading representation, wherein the determined current pose value has an accuracy of within about one meter.

19. The computer-implemented method of claim 15, wherein the ground truth dataset is annotated with granular labels from at least one of historical weather data, historical astronomical data, or degree of occlusion.

20. A computing system for localizing a vehicle comprising:
  one or more processors; and
  one or more non-transitory computer-readable media storing instructions executable by the one or more processors to perform operations, the operations comprising:
  the computer-implemented method comprising:
  accessing one or more computing devices, a machine-learned retrieval model that has been trained using a ground truth dataset comprising a plurality of pre-localized sensor observations, respective pre-localized sensor observations having a predetermined pose value associated with a previously obtained sensor reading representation;
  obtaining a current sensor reading representation obtained by one or more sensors located at the vehicle;
  inputting the current sensor reading representation into the machine-learned retrieval model;
  receiving from the machine-learned retrieval model, a determined current pose value for the vehicle based at least in part on one or more pre-localized sensor observations of the plurality of pre-localized sensor observations determined to be a closest match to the current sensor reading representation, wherein the determined current pose value has an accuracy of within about one meter;
  obtaining a current GPS estimate for the vehicle; and
  determining a subset of the plurality of pre-localized sensor observations that are within a predetermined threshold distance of the current GPS estimate for the vehicle; and
  wherein the one or more of the pre-localized sensor observations determined to be the closest match to the current sensor reading are determined from the subset of the plurality of pre-localized sensor observations that are within the predetermined threshold distance of the current GPS estimate for the vehicle.

* * * * *